United States Patent [19]
Hannon

[11] Patent Number: 5,397,464
[45] Date of Patent: Mar. 14, 1995

[54] TROUGH TYPE STRAINER BOX

[76] Inventor: Stephen R. Hannon, 2335 Ridge Tree Ct., Ellicott City, Md. 21042

[21] Appl. No.: 62,007
[22] Filed: May 17, 1993
[51] Int. Cl.⁶ .............................................. B01D 35/02
[52] U.S. Cl. .................................. 210/163; 210/473; 210/483; 210/248; 4/288
[58] Field of Search .............................. 210/162–165, 210/167, 473, 474, 477, 483, 248; 4/290–293, 286–289

[56] References Cited

U.S. PATENT DOCUMENTS

| | | | |
|---|---|---|---|
| 1,115,016 | 10/1914 | Pheils | 210/477 |
| 1,817,376 | 8/1931 | Izquierdo | 210/447 |
| 2,652,767 | 9/1953 | Childs | 210/DIG. 8 |
| 4,045,351 | 8/1977 | Peterson | 210/238 |
| 4,321,713 | 3/1982 | Thompson | 4/290 |
| 4,462,915 | 7/1984 | Friedman | 210/167 |
| 4,949,406 | 8/1990 | Canelli | 210/447 |
| 5,037,541 | 8/1991 | Ruey-Jang et al. | 210/165 |
| 5,069,781 | 12/1991 | Wilkes | 210/164 |
| 5,232,587 | 8/1993 | Hegemier et al. | 210/163 |
| 5,284,580 | 2/1994 | Shyh | 210/163 |

Primary Examiner—Robert A. Dawson
Assistant Examiner—Robert James Popovics
Attorney, Agent, or Firm—Gipple & Hale

[57] ABSTRACT

A trough type strainer apparatus comprising a housing with bottom and side walls defining an interior chamber, an inlet trough assembly and an outlet conduit connected to said side walls and communicating with said chamber. A support structure is mounted inside the housing secured to at least one wall and a perforated strainer basket provided with a mounting flange on its upper edge allows the strainer basket to be seated on the support structure within the housing. The perforated strainer basket has an angled perforated baffle panel which extends upward past the outlet conduit when the basket is seated within the housing.

13 Claims, 3 Drawing Sheets

TROUGH TYPE STRAINER BOX

BACKGROUND OF THE INVENTION

Restaurants when utilizing dishwashers, sinks, and laundry machines generate a large amount of waste water which contains solid particles of food or other debris which is only temporarily suspended in the waste water. When a floor sink is used to receive such waste water, the solid particles can easily lodge in the sink or more likely will lodge in adjacent plumbing or the sewer system which will result in the blockage of the plumbing or sewer system over time. This blockage will result in the waste water being prevented from running through the plumbing or sewer system causing the waste water to back up and flood the adjacent floor. Such flooding is not only unsanitary but can also result in physically damaged articles that are positioned where they can come into contact with the backed up waste water. Furthermore, such plumbing backup can cause increased wear and breakdown of the waste water generating apparatus.

Various types of screens and the like have been used in the past to filter out suspended solid particles, but such screens have been used primarily in connection with particular types of equipment or appliances such as dishwashers. In situations where there are a large number of appliances being used by the establishment, there is of necessity a number of screens that would have to be periodically inspected, cleaned or replaced, which is inconvenient, time consuming and requires a high degree of maintenance. It is unfortunately a fact of life that many of the kitchen personnel are semi-skilled, resulting in poor maintenance and waste disposal techniques. Furthermore, a number of appliances do not have any screens so that suspended solids will pass directly into the plumbing and sewer system causing blockage of the plumbing or sewer system. Furthermore, the screens also become clogged in use and this has the same undesirable effect of causing the backing up of waste water with attended flooding and/or damage to appliances or equipment. In addition to the destructive aspects of such flooding, unsanitary conditions are caused which could result in health department violations causing the loss of the establishment's license or lawsuits from workers who may be injured from sliding on a slippery floor or customers who may become sick.

Numerous attempts have been made to solve many of the aforenoted waste water screening problems. In U.S. Pat. No. 1,817,376, a removable perforated tray is placed in a housing positioned downstream on the drain pipe of a sink. A threaded closure cap is screwed over one end of the housing and is provided with a handle for facilitating the placing and removing of the cap on and off of the housing. The strainer tray slides into the housing with its front wall extending below the bottom wall of the strainer tray so as to provide a stop against the side of the housing positioning the strainer tray within the housing and below the drain pipe. U.S. Pat. No. 4,949,406 discloses a filter trap assembly to be used in conjunction with a sink which includes an elongated vertical pipe section connected by an open end to the drain of a sink and includes a closed end defining a liquid reservoir. A filter housing is disposed intermediate of the open and closed ends and has a removable filter element disposed therein to engage the liquid flow passing along the length of the vertical pipe section to trap solid materials therein. This patent bears some similarities to the U.S. Pat. No. 1,817,376. U.S. Pat. No. 4,045,351 discloses a kitchen or bathroom strainer device in which an elongated cylinder is mounted beneath the sink in communication with the sink drain. A mesh strainer holder is mounted within the cylinder housing and a disposable mesh strainer is mounted within the strainer holder. This mesh strainer is in the form of a semi-circular sleeve which is positioned to intersect the drain pipe and is removable from the cylindrical housing by removal of a rotatable cap which is mounted in the cylindrical housing. U.S. Pat. No. 4,321,713 discloses a large capacity drainage receptacle for flush mounting on a surface to be drained. The drainage receptacle is constructed with a specially configured mounting flange from which the receptacle body integrally depends. The drainage receptacle is formed of a light weight thin wall stainless steel and is configured to support a strainer basket which catches and retains solid foreign materials which pass through the drainage inlet. The strainer basket is provided with outwardly extending flanges which allow the strainer basket to be dropped into the drainage receptacle with the flanges seated on a floor surface of the drainage receptacle. U.S. Pat. No. 5,069,781 discloses a combined floor sink and strainer for removing solid particles in a fluid which passes through it. The device has a hollow substantially rectangular housing which holds a strainer basket and a locating and support structure for locating and supporting the strainer basket within the housing. Both the support structure and strainer basket have perforations to permit the passage of liquid and to preclude the passage of solid particles over a particular particle size. The strainer basket and supporting structure are provided with multiple fluid travel paths depending on the amount of debris collected in the strainer basket which prevents a reduction in fluid flow as sediment builds up in the sedimentation basket.

The present trough type strainer box is designed to allow fluid to pass through it so that the waste water is cleared of particulate matter. The box is made with a strainer basket which is easily mounted in the strainer box allowing for quick removal of the debris from the strainer and replacing it with a clean strainer basket without shutting down the appliance or the waste water disposal outlet. The removed strainer basket can be readily cleaned separate from the strainer trough. The strainer basket is provided a backup baffle or panel so that fluid can continue to flow through the outlet when the strainer box becomes filled with solid waste particles.

SUMMARY OF THE INVENTION

A trough strainer apparatus comprising a housing defining an inlet means and an outlet means, the inlet means comprising a trough structure which extends outside a wall of said housing to receive fluid from a drain pipe. A support structure is mounted inside the housing and comprises parallel linear flat side members secured to the interior of opposite side walls of the housing, a cross member connecting the ends of the side members, and rear panel support members secured to the ends of said side members and extending upwardly and angularly positioned on said side members towards the rear outlet wall. A removable perforated strainer basket is provided with a flanged mounting construction allowing the strainer basket to be seated on said support structure within said housing, the strainer basket including an upwardly projecting baffle member which extends above said outlet means.

The present invention relates to a trough type strainer box which is easily connected to waste water generator appliances, allowing waste water to be passed therethrough to remove debris from the waste water while discharging strained waste water into the outlet.

It is an object of the invention to provide for an apparatus that is capable of handling a high waste water flow rate and strain a large amount of sediment from the waste water.

It is an other object of the invention to provide a trough type strainer box with a removable perforated basket that does not impede the liquid flowing through it and which allows the strainer trough to be easily cleaned.

In the accompanying drawings, there is shown an illustrative embodiment of the invention from which these and other of objectives, novel features and advantages will be readily apparent.

DETAILED DESCRIPTION OF THE PREFERRED EMBODIMENT

Figure 1:
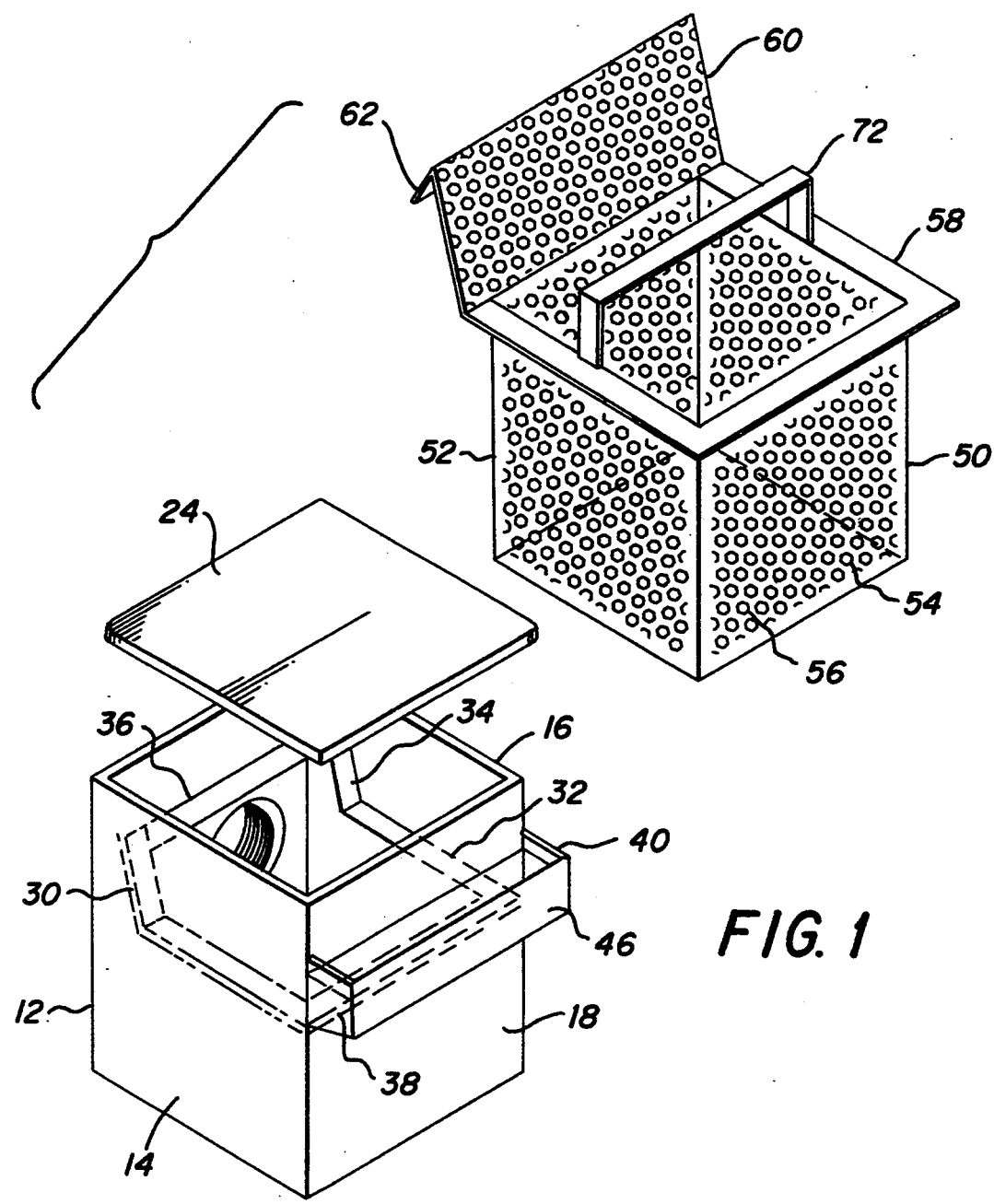
FIG. 1 is an exploded perspective view of the trough strainer box apparatus showing lid removed and the strainer basket removed with covered portions being shown in phantom.
Figure 3:
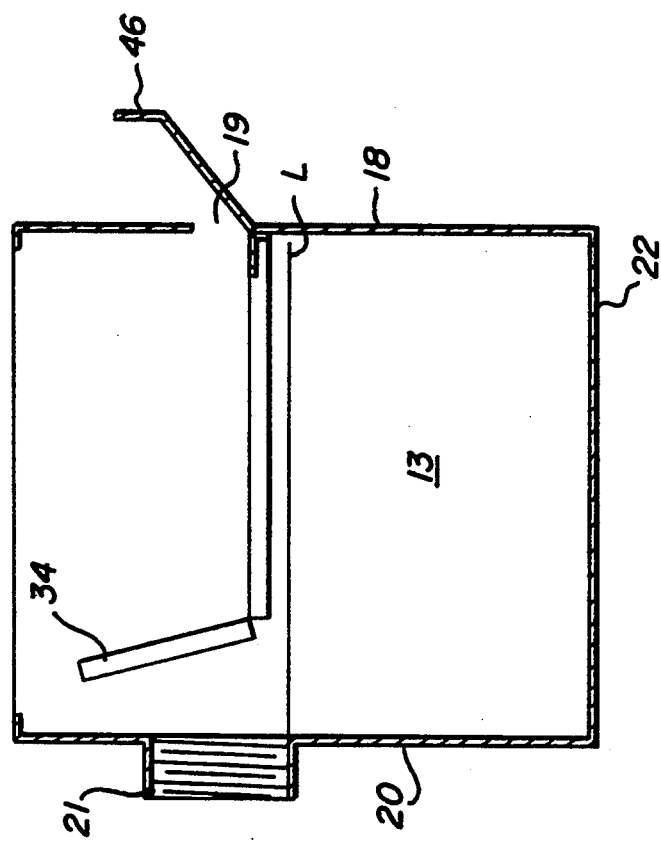
FIG. 3 is a cross-sectional view taken along the arrows shown in FIG. 2 along the line '3—'3.
Figure 2:
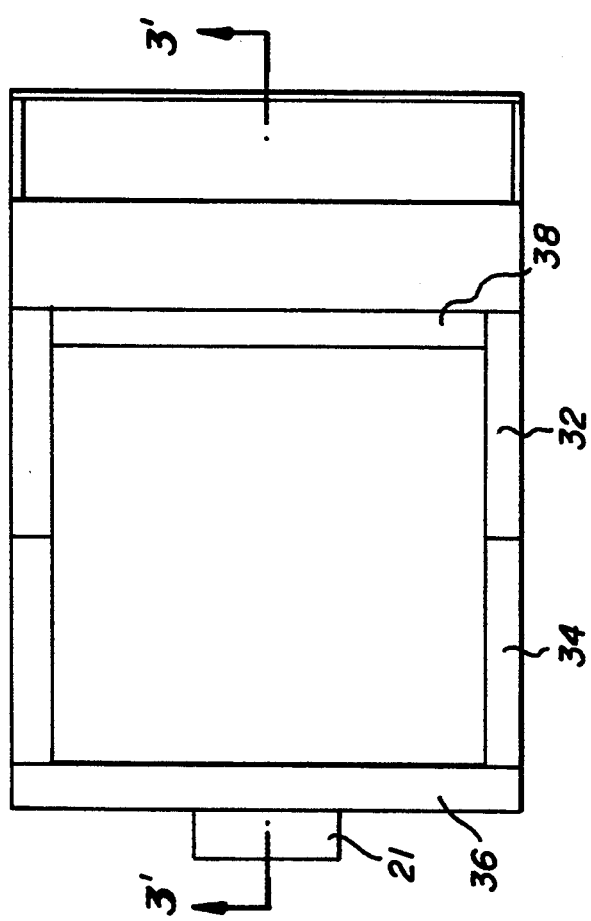
FIG. 2 is a top plan view of the apparatus shown in FIG. 1 with lid and strainer basket removed.
Figure 4:
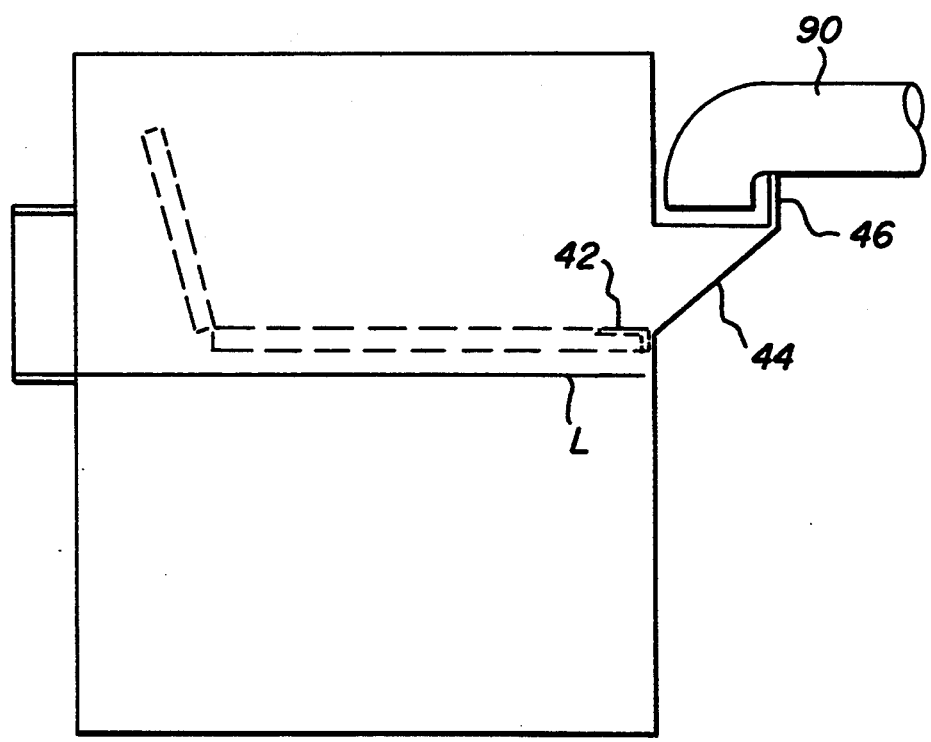
FIG. 4 is a side elevational view of the apparatus shown in FIG. 1 with strainer box removed and strainer box supports shown in phantom.

The preferred embodiment and best mode of the invention is shown in FIGS. 1 through 4. The trough type strainer box 10 comprises a generally rectangular shaped hollow housing 12, 16.5 inches high and 14 inches wide. The housing 12 has flat rectangular shaped side wall panels 14 and 16, an end wall panel 18 defining a fluid reception slot 19 or inlet and an outlet end wall panel 20 provided with a threaded conduit pipe 21. The lower edges of the end walls and side walls are connected to the substantially flat rectangularly shaped bottom portion or floor 22. A similarly shaped lid 24 is mounted on the upper or top end edges of the end and side walls. A waste discharge conduit 90 is shown in FIG. 4 in a position to discharge waste water from the appliance such as a sink, washer or the like into the trough 40 through slot 19 into the housing 12 and strainer basket 50. The end walls, side walls and floor are preferably made of 16 gauge stainless steel type 304 and are welded or braised together so that the end and side walls upper and lower edges fall in the same plane and form a chamber 13 in conjunction with the floor member 22. A strainer basket support assembly 30 is constructed inside the trough strainer housing 12 to support a strainer basket 50. The strainer basket support assembly 30 comprises linear flat side support members 32 which are welded to the side walls 14 and 16 above the liquid level "L" of the housing 12. Angled back panel support members 34 are secured to the distal ends of the side support members 32 near the outlet conduit and extend upwards towards the top of the box above the top of the outlet conduit 21. The angle formed the intersection of a plane run through the angled support members 34 and side support members 32 is 104° but can range from 100° to 110° and achieve the desired baffling effect on waste water overflow. These angled upright supports are optionally connected at their upper ends by a bridge cross member 36. The bridge cross member 36 is used to prevent the basket from being installed in the wrong direction. A front linear cross support member 38 connects the opposing ends of the side support members 32 and is secured to the inlet end wall 18. If desired, the front linear support member 38 and side support members 32 can be constructed of a one piece U-shaped construction.

A trough assembly 40 is constructed on the exterior of the inlet end wall 18 surrounding fluid entrance slot 19. The trough assembly 40 comprises a flanged inwardly projecting rear support member 42 which extends back over the top of the linear support member 38 to provide additional bracket support for the trough assembly, an angled trough base member 44 which extends outward and is angled upward from the exterior surface of the inlet side wall 18 and a perpendicular trough front facing member 46 which extends parallel to the inlet end wall 18 at an angle from the angled trough base 44. If desired, the base member 44 and front facing member can be constructed of a single piece of material and bent to form the desired configuration. Trough side members 48 are secured to the trough base 44 and front facing member 46 and are secured to the exterior surface of the inlet end wall 18. The sides 48 are constructed so that they are lower than the pipe 90 from the fixture feeding the box. This construction provides an air gap between pipe 90 and the side top level to provide backflow prevention. If the drain becomes clogged and the water backs up in the strainer box, the water will flow over the sides 48 and onto the floor instead of up into the feed pipe from the fixture. This is important in food establishments as it protects food upstream which may be situated in the sink.

A strainer basket 50 is designed to fit in the interior chamber 13 of housing 12 on the strainer basket support assembly 30. The strainer basket 50 comprises perforated side walls 52 secured to perforated end walls 54, both the end and side walls being secured to a perforated bottom member 56 to form a rectangular perforated box. A rim flange 58 is secured to the top surface of the side walls and end walls and extends outward from the outer surface of the perforated walls to form a support lip. A perforated backwash panel 60 is secured to one of the end walls and is angularly fastened onto the end wall so that it will provide a screen which extends above the conduit outlet. This provides added protection when the strainer basket becomes full and keeps the solid debris from passing into the outlet conduit. The back wash panel has an integrally formed rearwardly projecting limit member 62 which projects from the backwash plate to keep the panel 60 from being broken or bent from water pressure as it engages the inner surface of end wall 20 when it is pushed backward. A C-shaped handle 72 is secured to the rim flange 58 to allow the strainer basket 50 to be easily inserted into the chamber 13 of housing 12 and, conversely, allowing the same to be easily removed from the chamber to empty waste debris which has been trapped therein.

In the foregoing description, the invention has been described with reference to a particular preferred embodiment, although it is to be understood that specific details shown are merely illustrative, and the invention may be carried out in other ways without departing from the true spirit and scope of the following claims:

What is claimed is:

1. A trough strainer apparatus comprising a housing with bottom and side walls defining an interior chamber, an inlet means comprising a trough assembly located outside a side wall of said housing to receive fluid from a drain pipe which has a terminus extending into said trough assembly, said trough assembly providing fluid communication through a slot defined by said side wall into the interior chamber and an outlet means extending through a side wall and communicating with said chamber, a support structure mounted inside said housing secured to at least one wall, a strainer basket provided with mounting means allowing said strainer basket to be seated on said support structure within said housing, said strainer basket including an upwardly projecting panel member secured to said strainer basket which extends above said outlet means when said strainer basket is seated in said housing.

2. Apparatus as claimed in claim 1 wherein said outlet means is a threaded conduit allowing communication with the interior of said housing.

3. Apparatus as claimed in claim 1 wherein said strainer basket upwardly projecting panel member includes a rearwardly projecting limit member secured thereto and angled downward from the plane of said upwardly projecting panel member.

4. Apparatus as claimed in claim 3 wherein said panel member is perforated and angled with respect to the strainer wall it is secured to.

5. Apparatus as claimed in claim 1 wherein said support structure comprises parallel linear flat side members secured to the interior of opposite side walls of said housing extending into said housing chamber, a cross member connecting respective aligned ends of said side members, said cross member being positioned below said inlet means, and rear panel support members secured to other ends of said side members and to the side walls of said housing, said support members extending upwardly and being angularly positioned towards a housing side wall.

6. Apparatus as claimed in claim 5 wherein a plane taken along said side members and a plane taken along said rear panel support members intersect to form an angle which ranges between 100° and 110°.

7. Apparatus as claimed in claim 1 wherein a plane taken along said side members and a plane taken along said rear panel support members intersect to form an angle of about 104°.

8. Apparatus as claimed in claim 1 wherein said housing and said support structure is constructed of stainless steel.

9. Apparatus as claimed in claim 1 wherein said removable strainer basket comprises a rectangularly shaped strainer housing with perforated side walls and a perforated bottom, a top flange which extends perpendicular from said side walls around the top of said housing and a handle which is mounted to said strainer walls.

10. Apparatus as claimed in claim 9 wherein said panel member is perforated and is secured to at least one of said perforated side walls and extends upward and outward from said side wall.

11. A trough strainer apparatus comprising a housing defining an inlet means and an outlet means, said inlet means comprising an aperture defined by said housing, a trough structure which extends outside a wall of said housing to receive fluid from a drain pipe and direct same through said aperture, a support structure mounted inside said housing, said support structure comprising parallel linear flat side members secured to the interior of opposite side walls of said housing, a cross member connecting the ends of said side members, and rear panel support members secured to the ends of said side members, said rear panel support members being angularly positioned on said side walls, a strainer basket provided with mounting means in the form of a flange on at least two sides of said strainer basket allowing said strainer basket to be seated on said support structure within said housing, said strainer basket including an upwardly projecting baffle panel member which extends above said outlet means and is supported by said rear panel support members.

12. Apparatus as claimed in claim 11 wherein said removable strainer basket comprises a rectangularly shaped strainer housing with perforated side walls and a perforated bottom, a top flange which extends perpendicular from said strainer walls around the top of said housing and a handle which is mounted to said strainer walls.

13. A trough strainer apparatus comprising a housing defining an inlet means and an outlet means, said inlet means comprising an aperture defined by said housing and a trough structure which extends outside a wall of said housing to receive fluid from a drain pipe and direct same through said aperture, said trough structure being provided with side walls having a top surface which is lower than the end of the drain pipe to prevent backflow, said outlet means comprising an aperture defined by said housing, a support structure mounted inside said housing, said support structure comprising parallel linear flat side members secured to the interior of opposite side walls of said housing, and rear panel support members secured to the ends of said side members, said rear panel support members being angularly orientated with respect to said side members, a strainer basket provided with mounting means allowing said strainer basket to be seated on said support structure within said housing, said strainer basket including an upwardly projecting baffle panel member which extends above said outlet means and is supported by said rear panel support members.

* * * * *